United States Patent [19]
Otto

[11] 3,741,615
[45] June 26, 1973

[54] BEARING SEAL CASE MOUNTING

[75] Inventor: Dennis L. Otto, Malvern, Ohio

[73] Assignee: The Timken Company, Canton, Ohio

[22] Filed: May 3, 1971

[21] Appl. No.: 139,521

[52] U.S. Cl.............. 308/187.1, 277/37, 277/179, 277/189
[51] Int. Cl........................ F16c 33/78, F16j 15/32
[58] Field of Search.................... 277/37, 179, 189; 308/187.1

[56] References Cited
UNITED STATES PATENTS

| | | | |
|---|---|---|---|
| 2,819,106 | 1/1958 | Voorhees | 277/37 X |
| 3,614,183 | 10/1971 | Berems et al. | 277/153 |
| 3,531,168 | 9/1970 | Bainard | 277/37 X |
| 3,341,265 | 9/1967 | Paterson | 277/133 UX |
| 3,356,276 | 12/1967 | Bradfute | 277/37 |

Primary Examiner—Samuel B. Rothberg
Attorney—Gravely, Lieder & Woodruff

[57] ABSTRACT

A bearing seal case has a large circumferential wall which fits into a cylindrical socket in the end of a bearing cup. The circumferential wall includes an enlarged portion which frictionally engages the cylindrical surface of the socket by reason of an interference fit between the two, a reduced portion which tapers inwardly from the enlarged portion and is spaced inwardly from the cylindrical surface of the socket, and a locking bead which projects outwardly beyond the reduced and enlarged portions and into a relief formed in the cup at the end of the socket. To prevent slippage between the seal case and the cup, an elastomeric material is bonded to the reduced portion, and this material is interposed between the cylindrical surface of the socket and the reduced portion in a distorted condition so that it remains firmly engaged with the cup when the normal interference fit between the enlarged portion and the cylindrical socket wall diminishes to the extent that the seal case might otherwise work loose.

3 Claims, 4 Drawing Figures

PATENTED JUN 26 1973　　3,741,615

INVENTOR:
DENNIS L. OTTO
BY Gravely, Lieder & Woodruff
ATTORNEYS

BEARING SEAL CASE MOUNTING

BACKGROUND OF THE INVENTION

This invention relates in general to seal assemblies, and more particularly to a seal case mounting which enables a seal case to remain firmly engaged with its supporting structure in operation.

The ends of an all-purpose tapered roller bearing are normally closed by seal assemblies to retain lubricants within the interior of the bearing. Each seal assembly includes a seal case having a circumferential wall which is press-fitted into a socket at the end of the bearing cup, and that seal case has an elastomeric seal bonded to it for embracing a wear surface located beyond the bearing and forming a dynamic seal therewith. In operation the cup and seal case tend to move or shift relative to each other, due primarily to vibrations, impacts with foreign objects, and the like. Also, heavy thrust loads force the cone and rollers tightly into the cup and this tends to expand the cup. As a result the force at the metal-to-metal contact between the cup and seal case, that is the friction force created by the interference fit, varies. Sometimes the variance becomes so great that the seal case slips relative to the cup, and this causes wear and galling.

SUMMARY OF THE INVENTION

One of the principal objects of the present invention is to provide a seal case which remains firmly engaged with its supporting structure even when the seal case and its supporting structure expand and contract relative to each other so that no slippage between the seal case and the supporting structure occurs. Another object is to provide a seal case of the type stated which may be press-fitted into the socket at the end of a bearing race in the conventional manner, yet will remain firmly engaged with the walls of the socket notwithstanding differential expansions and contractions of the race and seal case. A further object is to provide a seal case of the type stated which is simple in construction and easy to manufacture. These and other objects and advantages will become apparent hereinafter.

The present invention is embodied in a seal case having a wall which frictionally engages a surface on a supporting structure. The seal case also has an elastomeric material interposed between one of its surfaces and the supporting structure for preventing slippage between the seal case and the supporting structure. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
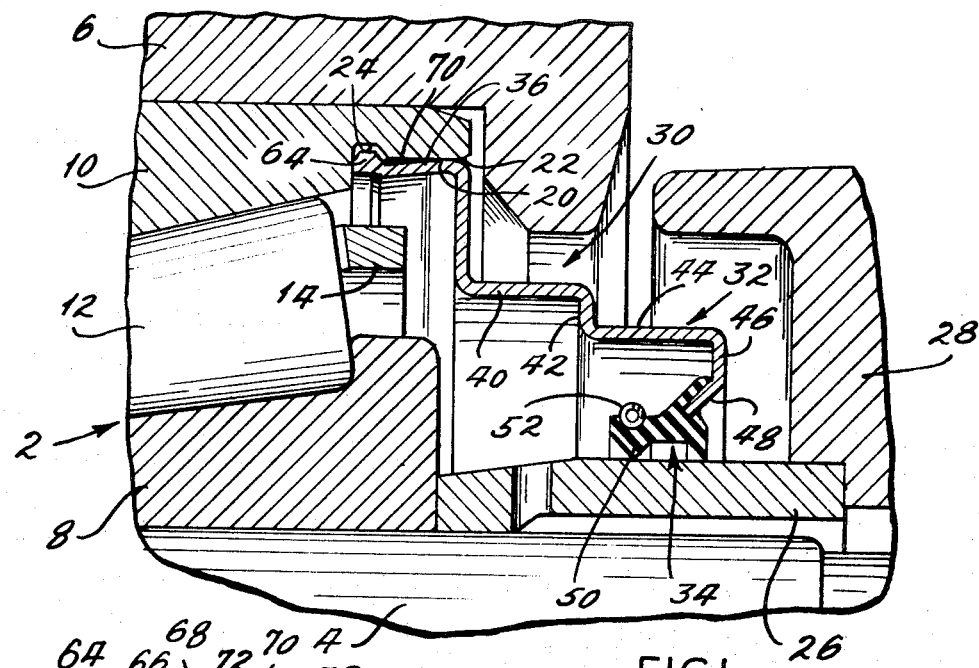
FIG. 1 is a fragmentary sectional view of a bearing provided with a seal case constructed in accordance with and embodying the present invention.

Referring now to the drawings, 2 designates a tapered roller bearing (FIG. 1) for journaling an axle or a shaft 4 in a containing structure 6 such as an adapter or housing in the side frame of a rail car truck. The bearing 2 includes a cone 8 through which the shaft 4 extends, and a cup 10, which is contained within the frame 6. Both the cone 8 and cup 10 have opposed tapered raceways, and the bearing 2 further includes tapered rollers 12 which are disposed between and engage those raceways. These rollers 12 roll along the raceways as the cone 8 and cup 10 rotate relative to each other, reducing friction to a minimum. Proper spacing is maintained between adjacent rollers by a cage 14 which is also disposed between the cone 8 and cup 10.

Beyond the large diameter end of its tapered raceway, the cup 10 has an axially extending cylindrical bore or socket 20, the diameter of which is greater than the diameter of the large end of the cup raceway. The socket 20 opens outwardly of the cup at a chamfer 22. At the inner end of the socket 20 the cup 10 has an inwardly opening relief 24 which possesses an annular configuration, and this relief 24 separates the cylindrical wall surface of the socket 20 from the cup raceway.

In addition to projecting through the cone 8, the shaft 4 also projects through a wear ring 26 which abuts and is indeed clamped against the end face of the cone 8 by an end cap 28.

The foregoing construction is conventional to tapered roller bearings and therefore will not be discussed in greater detail.

The end of the bearing 2 is closed by a seal assembly 30 (FIG. 1) including a seal case 32 which is secured to the cup 10 and an annular seal 34 which is molded from a suitable elastomer and is bonded to the seal case 32. The seal 34 embraces the wear ring 26, forming a lubricant barrier therewith. More specifically, the seal case 32 possesses a stepped configuration and is preferably formed from steel sheet in a stamping operation. It includes a large circumferential wall 36 which fits into the cylindrical socket 20 of the cup 10 and frictionally engages the cylindrical wall defining that socket. At one end the large circumferential wall 36 merges into a radial connecting wall 38 which in turn merges into an intermediate circumferential wall 40. The intermediate wall 40 projects axially away from the interior of the bearing 2, and at its outer end it turns into another radial connecting wall 42 to which a small circumferential wall 44 is connected. The small circumferential wall 44 also extends axially and at its outer end it merges into a radial end wall 46 having an oblique lip 48 thereon which turns inwardly toward the interior of the seal case 32.

The elastomeric seal 34 is bonded to the oblique lip 48 of the radial end wall 46 and includes a primary sealing lip 50 which engages the outer surface of the wear ring 26 and forms a lubricant barrier therewith. The seal ring 34 along the back of the primary seal lip 50 is embraced by a garter spring 52 which urges the primary lip 50 into snug engagement with the outwardly presented surface wear ring 26 so that no voids exist between the lip 50 and the wear ring 26.

Figure 2:
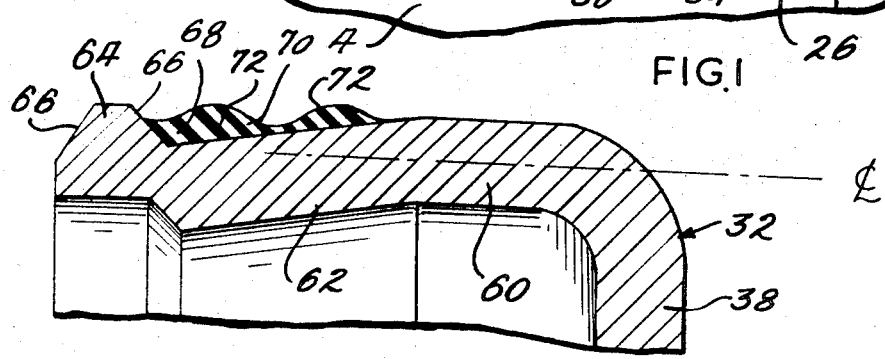
FIG. 2 is an enlarged fragmentary view of the seal case when detached from the bearing and showing the retaining beads in an undistorted condition.
Figure 3:
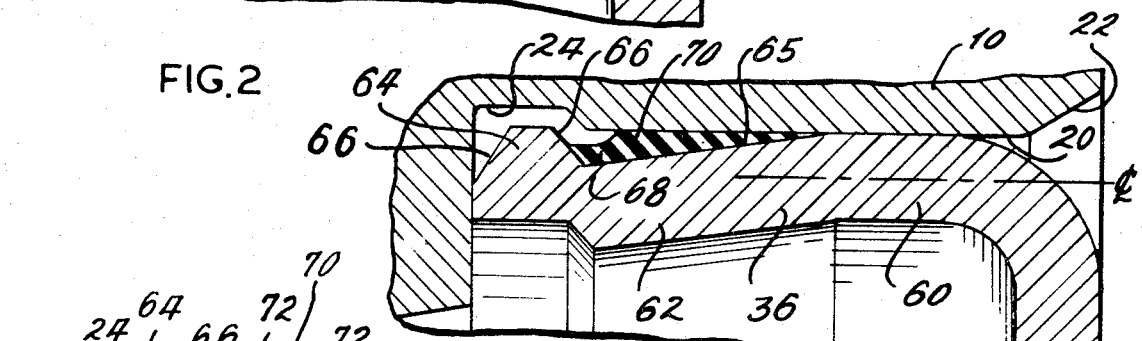
FIG. 3 is an enlarged fragmentary sectional view showing the interference fit between the large circumferential wall of the seal case and the socket wall of the bearing cup.
Figure 4:
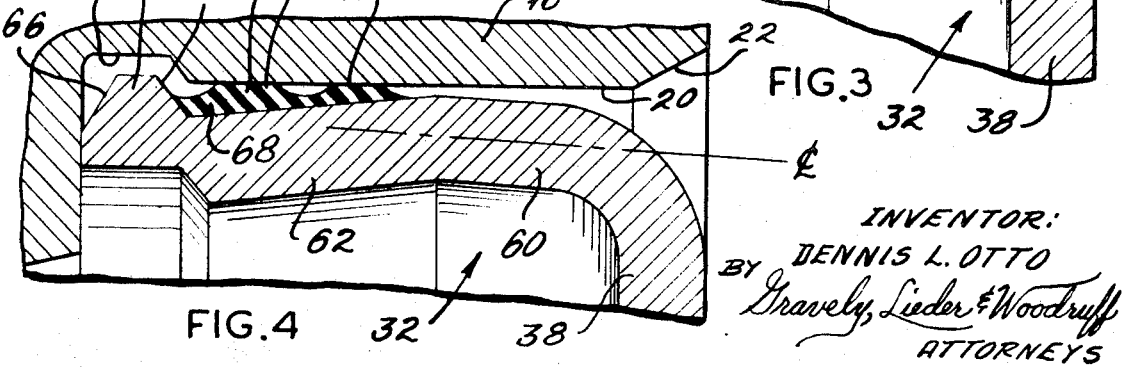
FIG. 4 is an enlarged fragmentary sectional view similar to FIG. 3, but showing the bearing cup expanded relative to the large circumferential wall of the seal case, the expansion being slightly exaggerated for purposes of illustration.

Referring again to the large circumferential wall 36 of the seal case 32, which is the wall disposed within the socket 20 of the cup 10, that wall (FIG. 2) is an integral structure composed of three sections, namely, an enlarged wall portion 60, a reduced or tapered wall portion 62, and a locking bead 64, and all of the foregoing sections are formed in the stamping operation by which the seal case 32 is shaped. The enlarged wall portion 60 is joined to the radial connecting wall 38, and when unrestrained it possesses a slight taper, the taper being downwardly toward the connecting wall 38 (FIGS. 2 and 4). The diameter of the enlarged portion 60, particularly at the large end of its taper, is slightly greater than the diameter of the socket 20 so that an interference fit exists between the cylindrical portion 60 and the socket 20 (FIG. 3). This interference fit contracts the large end of the slightly tapered enlarged wall portion 60 so that the enlarged portion 60 possesses a generally cylindrical shape when in the socket 20 (FIG. 3). In this connection, note how the centerline extending through the enlarged portion 60 parallels the surface of the socket 20 when the enlarged portion 60 is engaged with the wall of the socket 20 in an interference fit (FIG. 3), but is canted slightly when the wall of the socket 20 expands and leaves the enlarged portion 60 (FIG. 4).

The reduced or tapered wall portion 62 is joined to and formed integral with the enlarged wall portion 60 intermediate the ends of the large circumferential wall 26, and it tapers inwardly from the enlarged portion 60 so that its diameter becomes progressively smaller. Consequently, its average diameter is less than that of the enlarged wall portion 60, and its outwardly presented surface, which is likewise tapered, is spaced inwardly from the wall of the socket 20.

The locking bead 64 is formed integral with the small diameter end of the tapered portion 62 and projects outwardly therefrom, possessing an outside diameter greater than the outside diameters of either the tapered wall portion 62 or the enlarged wall portion 60. When the large circumferential wall 36 is fully inserted into the socket 20, the locking bead 64 is disposed at and indeed projects into the inwardly opening relief 24 (FIGS. 3 and 4), and accordingly the bead 64 axially positions the seal case 32 on the cup 10 and prevents it from working out of the socket 20.

The locking bead 64 has inclined end faces 66, and the inclined end face 66 located adjacent to the tapered wall portion 62 in combination with the tapered outside surface of that portion 62 forms a shallow V-shaped groove 68 around the outside of the large circumferential wall 36. Contained generally within the groove 68 is an annular elastomeric band 70, the outside surface of which is undulated when the bead is free of distorting forces to form a pair of elastomeric retaining beads or projection 72. The elastomeric band 70 is molded about and bonded to the tapered outwardly presented surface of the tapered wall portion 62 and to the adjoining inclined surface 66 of the locking bead 64. The greatest diameter of the band 70 is at its retaining beads 72, and that diameter does not exceed the outside diameter of the locking bead 64, but is greater than the outside diameter of the enlarged wall portion 60 (FIG. 2). The elastomeric band 70 furthermore terminates prior to the juncture of the tapered and enlarged wall portions 62 and 60 so that the outwardly presented surface of the enlarged portion 60 is not obscured.

To install the seal assembly 30 on the bearing 2, the large circumferential wall 36 of the seal case 32 is aligned with the socket 20 at the end of the bearing cup 10, whereupon an axially directed force is applied to the radial connecting wall 38. This force drives the large circumferential wall 36 into the socket 20. In particular, when the axial force is initially applied, the locking bead 64 at the end of the large circumferential wall 36 engages the chamfer 22 at the end of the socket 20, and this chamfer 22 cams the end of the large circumferential wall 36 inwardly, that is it contracts it, enabling the locking bead 64 to pass along the cylindrical surface of the socket 20. Since the elastomeric band 70 is contained within the shallow V-shaped groove 68 and does not project outwardly beyond the locking bead 64, it is not significantly distorted or subjected to appreciable shear forces during the insertion of the large circumferential wall 36 into the socket 20. In other words, the locking bead 64 leads the elastomeric band 70 through the socket 20 and further maintains the tapered portion 62 of the large circumferential wall 36 in a contracted condition so that the elastomeric band 70 is protected from shear forces during the insertion of the large circumferential wall 36 into the socket 20.

The contraction of the free end of the large circumferential wall 36 due to the engagement of the locking bead 64 with surface of the socket 20 to a limited extent contracts the enlarged portion 60 of the wall 36 so that the enlarged portion 60 slides into the socket 20 under the axial force applied to the radial connecting wall 38.

Once the large circumferential wall 36 is fully inserted into cylindrical socket 20, the locking bead 64 will be disposed at the inwardly opening relief 24 and indeed will snap outwardly into that relief. When this occurs, the enlarged and tapered wall portions 60 and 62 will also expand. The expansion of the enlarged portion 60 creates a tight metal to metal contact or interference fit between its outside surface and the cylindrical surface of the socket 20. In other words, the enlarged portion 60 frictionally engages the wall of the socket 20 and is contracted within the socket 20. The expansion of the tapered wall portion 62 compresses the elastomeric retaining beads 72 of the band 70 between the surface of the socket 20 and the tapered wall portion 62, causing the beads 72 to distort. The metal to metal press fit at the enlarged wall portion 60, however, prevents the compressive force on the retaining beads 72 from becoming great enough to cause excessive permanent set in the elastomer from which the elastomeric band 70 is molded.

During operation of the bearing 2 the frictional engagement between cylindrical surface of the socket 20 and enlarged portion 60 of the large circumferential wall 36 on the seal case 32 (FIG. 3) secures the seal assembly 30 to the cup 10 of the bearing 2. Moreover, the disposition of the locking bead 64 within the inwardly opening relief 24 axially positions the seal case 32 on the cup 10 and prevents it from working axially out of the socket 20. Of course, as the shaft 4 and containing structure 6 rotate relative to each other so will the cone 8 and cup 10. During this relative rotation the sealing lip 50 on the elastomeric seal 34 engages the outwardly presented surface of the wear ring 26 (FIG. 1) and forms a barrier which prevents lubricants from escaping from the interior of the bearing 2 and seal case 32.

Should the cup 10 expand relative to the large circumferential wall 36 of the seal case, due to impacts, vibrations, high thrust loads and the like (FIG. 4), or should the large circumferential wall 36 contract relative to cup 10, due to physical contact with external parts, the metal to metal interference fit between the enlarged portion 60 of the large circumferential wall 36 and the cylindrical surface of the socket 20 will diminish or in other words the force exerted by the enlarged wall portion 60 against the cup 10 will not nearly be so great. Consequently, the frictional engagement between the cup 10 and the enlarged portion 60 of the wall 36 will lessen appreciably. Indeed, in some instances the enlarged portion 60 of the large wall 36 and the cylindrical surface of the socket 20 actually part. In a conventional seal construction the reduction of the interference fit between the seal case and the surface of the socket 20 or the complete absence of such an interference fit, enables the seal case to rotate relative to the cup 10 and this in turn causes wear and galling. Slippage and the accompanying wear and galling does not occur with seal assembly 30, for as the interference fit reduces or disappears due to differential expansion and contraction between the enlarged wall portion 60 and the surface of the socket 20, the retaining beads 72 of the elastomeric band 70 expand and remain firmly engaged with the surface of the socket 20 (FIG. 4). Thus, the seal case 32 will not slip relative to the cup 10.

To remove the seal assembly 30 from the cup 10, a removal tool (not shown) having retractable jaws is inserted through the cone 8 and thereafter its jaws are expanded and located against the inwardly presented surface of the radial connecting wall 42. Thereupon, an axial force is applied to the tool which transmits the force to the seal case 32. This force initially brings the inclined surface 66 on the locking bead 64 against the side of the relief 24 so as to cause the locking bead 64 to be cammed inwardly and engaged with the cylindrical surface of the socket 20. The slight axial movement of the seal case 32 while the locking bead 64 is still in the relief 24 is not enough to shear the elastomeric retaining beads 72. Once the locking bead 64 is brought into the socket 20 and engaged with the cylindrical surface thereof, the tapered portion 62 of the large wall 36 is contracted and the elastomeric retaining beads 72 are held far enough from the socket wall to prevent shear forces of a magnitude which will destroy the elastomeric band 70 as the large wall 36 is completely withdrawn from the socket 20.

This invention is intended to cover all changes and modifications of the example of the invention herein chosen for purposes of the disclosure which do not constitute departures from the spirit and scope of the invention.

What is claimed is:

1. A seal case carried by a supporting structure having a bore defined by a circumferential wall surface and a relief opening into the bore; said seal case comprising a first metal portion frictionally engaged with the circumferential wall surface of the supporting structure, the normal fit between the first portion and the circumferential wall surface being an interference fit; a second metal portion connected rigidly to the first portion and spaced from the cylindrical wall surface of the supporting structure, the second metal portion being imperforate and being located deeper in the bore than the first portion; an elastomeric material interposed between the second portion and the supporting structure, the elastomeric material having at least one projection thereon which engages the circumferential wall surface of the supporting structure and is distorted inwardly thereby so that the elastomeric material will remain engaged with the supporting structure as the supporting structure and seal case expand and contract relative to each other; whereby no slippage between the seal case and supporting structure occurs when the interference fit momentarily diminishes or disappears; and a rigid locking bead on the second metal portion at the end thereof remote from the first metal portion, the locking bead projecting outwardly from the second metal portion so that it will lead and protect the elastomeric material as the sal case is inserted axially into the bore, whereby the elastomeric material is not subjected to excessive shear forces, the locking bead normally projecting into the relief so as to retain the seal case in the bore.

2. In a bearing assembly including a bearing and a wear surface positioned beyond the bearing, the bearing having an outer race provided with a generally cylindrical socket opening outwardly toward the wear surface and inwardly terminating at an annular relief which opens toward the axis of rotation for the bearing; an improved seal assembly for closing the end of the bearing and comprising: a seal case including a circumferential wall fitted snugly in the cylindrical socket of the outer race and a locking projection on one end of the circumferential wall and extended outwardly beyond the wall and into the relief to retain the seal case in the socket, the circumferential wall having an enlarged portion which prior to insertion into the cylindrical socket has a diameter greater than the diameter of the cylindrical socket so that when the circumferential wall is inserted into the socket the enlarged portion thereof will frictionally engage the surface defining the generally cylindrical socket, the circumferential wall further having an imperforate reduced portion joined to the enlarged portion and being smaller in diameter than the enlarged portion so that the reduced portion is spaced from the surface defining the cylindrical socket when the enlarged portion is frictionally engaged with that surface; an elastomeric material bonded to the imperforate reduced portion and engaging the surface of the cylindrical socket such that it is normally distorted inwardly by that surface so that when the frictional engagement between the socket surface and the enlarged portion diminishes, the elastomeric material will expand outwardly and prevent the seal case from slipping relative to the outer race, the elastomeric material being further located adjacent to the locking projection so that the projection will lead the elastomeric material as the seal case is inserted into the socket, whereby the locking projection protects the elastomeric material from excessive shear forces; and a seal carried by the seal case and engaging the wear surface.

3. The structure according to claim 2 wherein the reduced portion tapers inwardly from the enlarged portion.

* * * * *